March 14, 1944. G. N. JEPPSON ET AL Re. 22,457
SEGMENTAL ABRASIVE WHEEL
Original Filed April 2, 1928
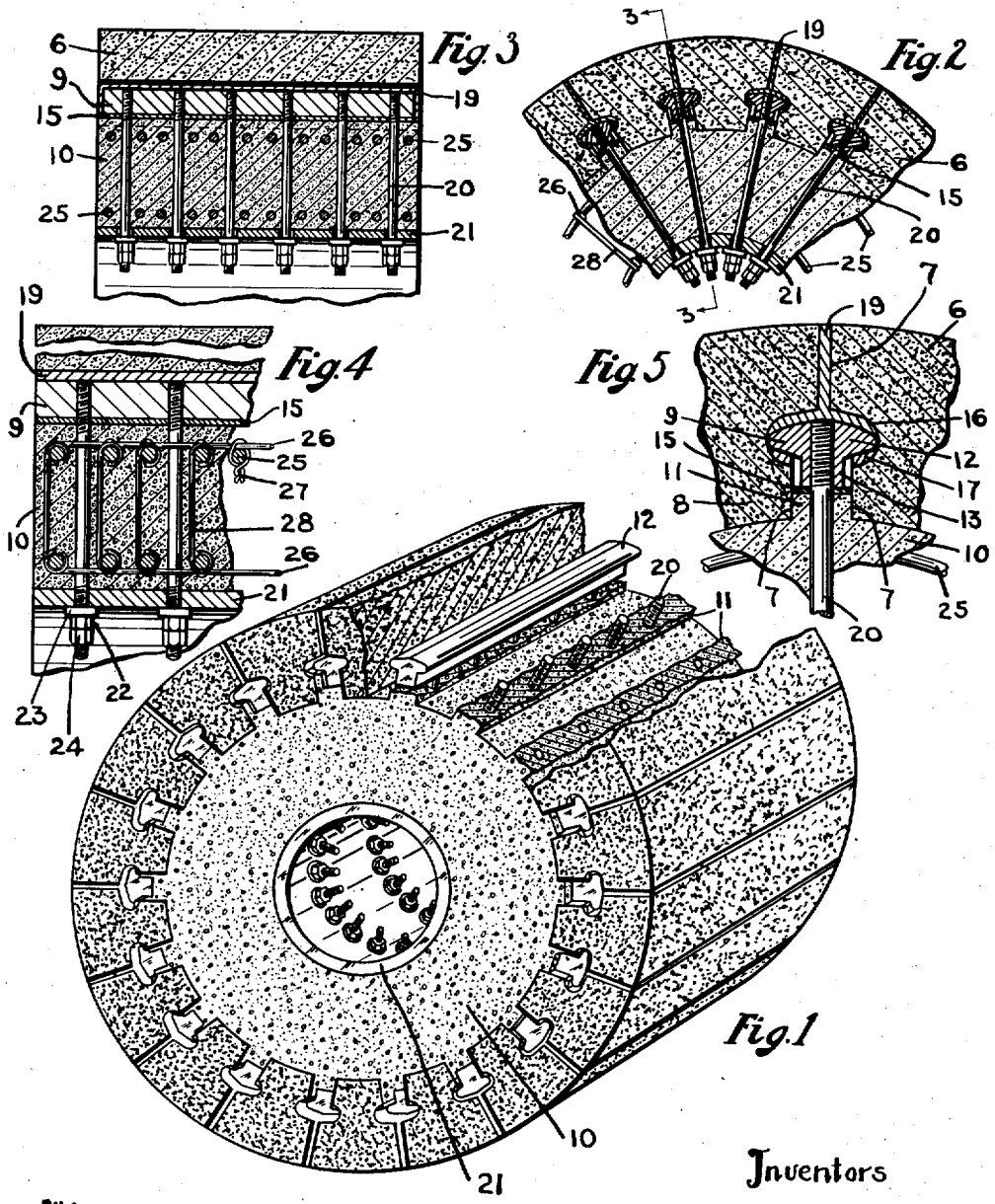
Witnesses
W R Greenwood
Margaret M. Hoyt
Inventors
George N. Jeppson
Thure Larsson
By Clayton R. Jenkins
Attorney Reissued Mar. 14, 1944

Re. 22,457

UNITED STATES PATENT OFFICE 22,457

SEGMENTAL ABRASIVE WHEEL

George N. Jeppson and Thure Larsson, Worcester, Mass., assignors to Norton Company, Worcester, Mass., a corporation of Massachusetts Original No. 1,865,523, dated July 5, 1932, Serial No. 266,481, April 2, 1928. Application for reissue December 18, 1943, Serial No. 514,871. In Canada October 4, 1928

19 Claims. (Cl. 51—207)

This invention relates to grinding wheels and more particularly to a segmental grinding wheel in which the segments of abrasive grains bonded by verified ceramic material are mounted upon a rotary support.

It has been proposed heretofore to make a large sized grinding wheel of abrasive segments mounted on a metal drum for use in grinding wood pulp and the like. Such a segmental wheel is however expensive to manufacture, partly because of the size and weight of the drum but more because of the difficulties involved in mounting the segments on the drum. A wheel used for grinding wood pulp is subjected to enormous forces from without, owing to the fact that the logs of wood are pressed against the wheel under hydraulic pressure, as well as large internal stresses resulting from the centrifugal force set up by rotating the wheel at high speed and because of expansion and contraction of the wheel under the changes of temperature required for grinding the pulp in the presence of hot water. It has heretofore been advisable, in order to mount the segments rigidly and securely on the metal drum, to provide each segment with a metal shoe and to have the surface of the drum carefully ground to a smooth and accurate shape in order that the shoes of the segment may fit correctly thereon.

The primary object of this invention is to avoid the necessity of using a massive iron drum which must be accurately finished and shaped to fit the segments and which must be sufficiently rigid and strong to hold them under the enormous strains of the grinding operation, and particularly to provide a simple, inexpensive type of segmental grinding wheel which may be readily manufactured and assembled and which will serve efficiently for grinding wood pulp as well as various other types of material.

A further object of the invention is to provide a unitary type of grinding wheel made up of abrasive segments mounted rigidly in position on a central support, and particularly one in which the central supporting body is formed as a monolithic structure which is substantially integral with the segments.

To the accomplishments of these objects and such others as will be apparent to one skilled in the art, we propose to utilize a concrete or other monolithic structure as the supporting body for a plurality of abrasive segments arranged on the surface thereof, and in order that the segments may be safely held in position under the enermous stresses of a grinding operation, we employ clamping blocks suitably secured to the concrete body and engaging the abrasive segments to hold them rigidly in position.

One embodiment of this invention is shown in the accompanying drawing, in which:

Fig. 1 is a perspective of the grinding wheel with several of the wedge-shaped abrasive segments removed to show the supporting concrete body, as well as the adjustable clamping blocks which secure the segments to the body;

Fig. 2 is a fragmentary detail in sectional elevation showing the abrasive segments, clamping blocks and the adjustable bolts embedded in the concrete and securing the segments in position;

Fig. 3 is a sectional elevation on the line 3—3, Fig. 2;

Fig. 4 is an enlarged sectional elevation similar to Fig. 3, but taken on a different line on Fig. 2, showing the reinforcing members which strengthen the concrete body; and Fig. 5 is a fragmentary detail in sectional elevation showing, enlarged, the abrasive segments in their assembled position.

The embodiment of our invention illustrated in the drawing comprises a plurality of segments 6, composed of abrasive grains bonded by suitable material, such as vitrified ceramic material, which are mounted with their side faces 7 spaced apart to form an annular grinding body. The inner portions 8 of the segments are secured in position by means of clamping blocks 9 suitably secured to the inner concrete cylinder 10. In the form illustrated, the segments are secured against lateral, circumferential motion by the ribs 11 on the cylinder located between the inner ends of the segments.

The clamping blocks 12, in the form illustrated comprise wedge shaped heads formed on the outer ends of rectangular webs 13. These webs may rest on strips of elastic material 15, such as rubber or other resilient material, suitably placed between the bottoms of the webs and the ribs 11 to prevent the concrete from flowing around the webs when the central body is cast, and yet provide a pad of sufficient springiness to permit the tightening of the clamping blocks.

Each segment, at the lower portions of the reentrant shoulders 16, is provided with an inner facing shoe 17 of lead cast integrally thereon and bonded intimately with the porous surface of the segment. These shoes 17, which extend the full width of the segments, have a fitting engagement with the lower portions of the blocks 6 (Fig. 5). The interstices between the adjacent faces 7 of the segments are filled with a suitable cementitious filler 19, such as lead, which is poured in a molten state so that the heads 12 become completely covered (Fig. 5).

Each clamping block 12 is connected to a mandrel 21 within the concrete cylinder 10 by a plurality of bolts 20, which are incased in the concrete. The upper ends of the bolts 20 are threaded into the webs 13 while the lower ends of the bolts pass loosely through the mandrel 21. The bolts 20, which may be somewhat elastic under tension, have nuts 22 and washers 23 thereon, serving to secure the bolts to the mandrel 21, a locking nut 24 being used to prevent the parts from becoming loosened.

The concrete cylinder 10 is preferably reinforced. To this end numerous concentric circular hoops 25 are arranged as shown in Figs. 2, 3 and 4. A plurality of cross rods 26 are connected to the peripheries of the hoops 25 by a twisted wire tie 27 which is wrapped around the hoops and rods at each point of contact. The two concentric rows of hoops are also connected by wires 28 which have their respective ends twisted about the hoops.

To construct the grinding wheel, the reinforcing net-work composed of the hoops 25, the rods 26 and wires 28, is formed loosely around the mandrel 21. The clamping blocks are then threaded upon the upper ends of the bolts 20, the lower ends of which are inserted through the holes in the mandrel and then provided with the washer 23, the nut 22 and the nut 24. The nuts 22 and 24 are adjusted to allow the clamping blocks to be withdrawn and positioned from the mandrel the proper distance in which they may be braced by temporary wooden braces or by sleeves of metal or other material surrounding the bolts, and which may form a permanent part of the wheel structure.

After the clamping blocks are braced outwardly from the mandrel, the wedge shaped abrasive segments are slipped sidewise between the pairs of blocks 12, and they interlock with the reentrant shoulders 16 and engage the lead facing shoes 17. After the various segments have been placed in position, the crevices between the segments are then wedged to hold the grinding surfaces thereon in the proper relative relation. This may necessitate adjustment of the position of the blocks 12 through manipulation of the nuts 22 and 24.

When the segments are all assembled in position and wedged apart to form the proper cylindrical grinding surface they are bound with wire so that they may be up-ended upon a circular form forming a base upon which to pour the concrete. The temporary braces, if they were used, are removed and the bolts 20, between the mandrel and the webs 13 are provided with sleeves of heavy grease. The concrete is now poured into the space between the mandrel and the segments. During this operation the reinforcing net-work may be held in its proper central position without difficulty. The fluid concrete flows into engagement with the bottom faces of the segments and fills the interstices between the packings 15 beneath the clamping blocks and the side faces 7 of the segments, thus forming the ribs 11 on the concrete cylinder 10. The concrete makes an intimate bond with the porous surface of the segments.

After the concrete has set, the wires binding the segments together and the wedges between the adjacent faces of the segment are removed. The nuts 22 are now sufficiently tightened so that the greased bolts 20 pull the heads 12 of the clamping blocks against the facing shoes 17, tightly squeeze the elastic strips 15 between the web bottoms and the ribs 11, and draw the segments down into firm contact with the surface of the croncrete cylinder 10. This tightening process places the elastic bolts under longitudinal tension. The bolts thus permit expansion of the wheel under heat, and contraction of the wheel upon cooling. After this operation the lead filler 19 is poured into the crevices between the adjacent faces of the segments down to the heads of the clamping blocks 12 which are covered by the filler. The end faces of the concrete cylinder are then provided with suitable flanges whereby the grinding wheel may be supported upon a driving spindle.

It will be apparent to those skilled in this art that changes may be made in the details of construction and in the steps of the method, the described and illustrated embodiment of the invention being intended as an example of its underlying essentials, the features whereof will be definitely stated in their true scope in the claims hereto appended. It will also be understood that one may construct a wheel, by this method, which grinds on one plane end face, and that various other shapes as well as sizes of wheel may be thus made. It will also be understood that we may utilize in place of concrete various types of fluid material capable of being poured or molded in situ and of setting to a hard condition, and forming a support for the abrasive blocks.

Having thus described our invention, what we claim as new and desire to secure by Letters Patent is:

1. That improvement in the art of making segmental grinding wheels which consists in arranging a plurality of abrasive segments independently of their final internal support in an annulus so as to form by their succession of faces a cylindrical grinding surface, then forming the internal supporting structure for all the segments in situ within the annulus, and thereafter adjustably tensioning tension elements connected to the segments for thereby forcing the segments radially inwardly into position on said structure to hold them thereagainst in opposition to centrifugal forces exerted during subsequent operation of the wheel.

2. That improvement in the art of making segmental grinding wheels which consists in connecting loosely by tension elements a plurality of circumferentially arranged and spaced clamping blocks to a mandrel, arranging a plurality of abrasive segments respectively between successive blocks and in operative connection to said blocks and materially spaced from said mandrel and capable when arranged in an annulus to form by their succession of faces a cylindrical grinding surface, adjusting the connection of the tension elements to the mandrel to achieve proper relation of said faces, filling the space between the mandrel and the internal faces of the segments with a moldable material capable of solidifying and of forming when solidified a support for the segments, causing said material to harden, and thereafter setting the tension of said tension elements for adjustably drawing the clamping blocks toward the mandrel and thereby fixing the segments rigidly in position on the support throughout dimensional changes caused in the wheel by temperature changes and in opposition to centrifugal forces exerted during subsequent operation of the wheel.

3. That improvement in the art of making segmental grinding wheels which consists in building loosely around an annular mandrel a reinforcing net-work that has hoop means of greater radius than the radius of said mandrel; connecting loosely to the mandrel, by radially-extending adjustable tension elements, a plurality of circumferentially arranged clamping blocks having their clamping elements engaging the ends of a plurality of abrasive segments shaped to form when in proper end-to-end relation an annulus of greater inside radius than the radius of said hoop means to thereby form the outer boundary of an annular space radially traversed by said tension elements and having said hoop means therein; arranging said plurality of abrasive segments between said clamping blocks, by adjusting said tension elements, in respective positions spaced radially from said mandrel and spaced radially outwardly from said net-work hoop means to bring their outer abrasive surfaces in proper relative relation to form a cylindrical grinding surface; and then filling the space between the mandrel and the segments and about said net-work with a moldable material capable of solidifying and forming when solidified an internal annular substantially monolithic support for the segments which are held thereagainst by said tension elements.

4. A grinding wheel comprising a plurality of abrasive segments arranged in spaced relation from an axis to form a hollow abrasive annulus of relatively large radius, a massive annular body of concrete molded in position within said abrasive annulus and forming a support coacting to hold said segments against grinding reactions that tend to thrust them radially inwardly, a metal annulus encased by said body of concrete and of materially lesser radius than the maximum radius of the latter and spaced inwardly from said abrasive annulus, said abrasive segments being in the final wheel structure backed up by said body of concrete and forming an external cylindrical grinding surface, clamping members engaging the segments and adjustable means associated therewith comprising adjustable tie-rods having connections with said clamping members and said metal annulus and extending radially within the concrete of said annular body and which coact by adjustment thereof to position the clamping members and hence the abrasive segments at the proper distance from said metal annulus for the reception in the space therebetween and about said tie-rods of the concrete to form and mold said massive annulus body against said segments and which serve as tension members, during operation of the wheel and after setting of the concrete, to hold the segments against radial separation from the support and to draw the segments radially inwardly into a rigid relationship to the support during contraction of the wheel upon cooling and to hold them against separation in a radial direction from the support by the action of centrifugal forces and during expansion of the wheel under heating.

5. That improvement in the art of making segmental grinding wheels which consists in bolting loosely to an annular mandrel a plurality of clamping blocks having clamping elements with circumferential spaces within which to accommodate abrasive segments, arranging a plurality of abrasive segments in said circumferential spaces between the clamping blocks and in interengagement with the clamping elements thereof and giving said segments respective positions, by adjustment of the bolts, to respectively space them properly from said mandrel to form by their outer faces a cylindrical grinding surface, filling the annular space between the mandrel and the inner faces of said segments with a moldable material capable of solidifying and thereby form a seat and an internal support for all of the segments capable of resisting independently of said mandrel inward radial thrusts exerted thereagainst by said segments due to ultimate grinding ing reactions, and utilizing elastic tension in said bolts to hold said clamping blocks in position to maintain firm engagement of the segments with said seat against the action of centrifugal force during the operation of the wheel.

6. The method of making a grinding wheel comprising the steps of assembling a set of abrasive segments in a spaced annular arrangement independently of their final support so as to form a grinding surface, casting a body of solidifiable material within the annulus and in intimate contact with the bottom faces of the abrasive segments so as to form a supporting seat therefor, then after said body has solidified forcing the segments radially inwardly into firm contact therewith, and filling the crevices between the segments.

7. A built-up segmental grinding wheel comprising a plurality of abrasive segments arranged as an annulus of substantial internal radius to form a large-diametered external cylindrical abrasive surface; a metal annular member of much smaller radius than the internal radius of said annulus; an annular rotary support of large radial dimension and made of non-metallic material molded in situ in the space between said annular member and said abrasive annulus and which contacts with and fits intimately against inwardly exposed surfaces of the segments to form the sole seat and a massive internal backing for the segments; and radially extending tie-rods within and traversing the said molded material to connect the segments to said annular member, said tie-rods being adjustable for drawing the segments radially inwardly during assembly to position their grinding surfaces in proper relative relation to form said annulus and thereby coact to position them to form by said inwardly exposed surfaces thereof an internal annular wall for the reception and molding thereagainst of said material to form said seat, said tie-rods exerting radially inward pull upon said segments and securing said segments rigidly in operative position on said support against said seat in opposition to the action of centrifugal force during subsequent operation of the wheel.

8. A grinding wheel comprising a plurality of abrasive segments arranged as an annulus of substantial internal radius to form a large-diametered external cylindrical abrasive surface; an annular support therefor of substantial radius and made of a material molded in place within said annulus and having its surface molded against and forming a supporting seat for the inner faces of the segments; and means, including adjustable clamping members which are set and locked to have the desired holding effect during subsequent operation of the grinding wheel and which are secured to the support, and cooperating shoulders on the segments engaged by said clamping members, for forcing the segments radially inwardly against forces occurring during grinding and which tend to dislodge them and thereby securing them against said forces with their said inner faces held in firm contact with said supporting seat of the support.

9. A grinding wheel comprising a plurality of abrasive segments arranged in spaced relation as an abrasive annulus of substantial internal radius to form a large-diametered external cylindrical abrasive surface; a monolithic body of cement within said annulus and forming substantially the sole support for the annulus at the inner faces of the segments thereof to give direct support against grinding reactions tending to force the segments radially inwardly, the outer surface of said monolithic body being molded and fitting intimately against the irregular surface of each abrasive segment to support it against said grinding reactions; adjustable means, including clamping elements engaging the abrasive segments and tension elements extending radially into said monolithic body, for placing said tension elements under tension to draw said clamping elements into tight engagement with the abrasive segments for forcing the segments radially inwardly into firm contact with said body and insure firmness of contact against the action of centrifugal forces and against the action of thermal changes in the wheel; and a filler in the interstices between adjacent faces of the segments.

10. A grinding wheel comprising a plurality of abrasive segments arranged in spaced relation as an annulus of substantial internal radius to form a large-diametered external cylindrical abrasive surface; an annular supporting body of substantial radial dimension molded in position within said annulus against and intimately fitting the inner surfaces of said abrasive segments, said body forming substantially the sole internal support for the segments to transmit driving torque to them against grinding reactions tending to displace them in circumferential direction, said segments having clamping shoulders formed in their adjacent end faces with metallic facings on said shoulders; fillers in the interstices between adjacent end faces of the segments to prevent direct face-to-face contact therebetween; and adjustable means, including clamping elements engaging the metallic facings of said shoulders and tension elements extending from said clamping elements radially into said annular supporting body, for placing said tension elements under tension to draw said clamping elements and metallic facings into tight engagement against said shoulders of the abrasive segments to force the segments radially inwardly into position on the supporting body with a radial pressure that holds them against separation from the body by centrifugal forces and during dimensional changes accompanying thermal changes in the wheel.

11. A grinding wheel comprising a monolithic externally cylindrical body having a plurality of transverse channels formed in its outer surface and circumferentially spaced and thereby providing transverse circumferentially spaced ribs; a plurality of abrasive segments having portions respectively seated in said channels whereby said ribs hold said segments against material displacement circumferentially relative to said body; a plurality of clamping blocks, each being located between and engaging the ends of adjacent segments, said blocks and segments having cooperating interlocking surfaces and adjustable means for securing each block to said body.

12. A grinding wheel comprising a cylindrical body having a plurality of channels formed laterally therein, a plurality of abrasive segments seated in said channels, each segment having reentrant shoulders formed on its opposite side faces and facing shoes thereon, clamping blocks, each engaging the shoes of a pair of adjacent segments, and a filler in the interstices between adjacent faces of the segments.

13. A grinding wheel comprising a central annular mandrel; a concrete cylinder of materially greater radius than said mandrel and encasing the latter and extending radially outwardly from the mandrel to form a monolithic annulus of substantial radial dimension; a plurality of abrasive segments arranged in an annulus about said cylinder and having portions intermediate of their ends embedded in the surface of said cylinder which thereby has transverse ribs formed thereon to resist grinding reactions tending to displace the segments in circumferential direction; a plurality of clamping blocks having clamping elements between the segments, said segments having shoulders at their adjacent ends and said shoulders having metallic facings engaged by said clamping elements, said metallic facings and said clamping elements having cooperating interlocking surfaces; filler means interposed between adjacent end faces of said segments to prevent face-to-face contact therebetween; and bolts having connections adjacent their inner ends with said mandrel and extending radially therefrom and within said monolithic annulus and through said transverse ribs for connecting said clamping blocks to said mandrel to hold said segments firmly to said monolithic annulus against the action of centrifugal forces and against the action of thermal changes within the wheel, said bolts being, by said connections and said mandrel, secured to said concrete cylinder.

14. A grinding wheel comprising a central mandrel, a reinforced concrete cylinder encasing the mandrel, a plurality of abrasive segments on the surface of said cylinder, a plurality of clamping blocks between the segments, said blocks and segments having cooperating interlocking surfaces, bolts connecting each block with the mandrel which are arranged to move freely through the concrete, and a filler in the interstices between adjacent faces of the segments.

15. A segmental grinding wheel assemblage comprising a hollow mandrel; a series of abrasive segments surrounding but radially spaced a substantial distance from the mandrel for forming externally a large-diametered cylindrical grinding surface and internally thereof an annular space of large radial dimension; clamping blocks having clamping elements engaging the segments and having tie-rods extending radially therefrom across said annular space and provided with connections to said mandrel, whereby said tie-rods and said mandrel are adapted to react against centrifugal forces exerted upon the segments during rotation of the wheel and hold the segments against outward movement thereby; means operable during assembly for adjusting the length of said tie-rods whereby the clamping blocks are adjustably secured in relation to the mandrel to position them and to locate the segments at proper radial distances from said mandrel to form an annulus providing said cylindrical grinding surface externally and to receive a moldable concrete mix internally thereof and in said annular space; and a monolithic filling of concrete in said annular space and radially traversed by said tie-rods and molded and solidified about said mandrel and against the inner faces of said segments to serve as the internal support for the segments to resist forces acting radially inwardly upon the segments and to transmit driving torque to the segments in opposition to the reactions caused by work pressed against said cylindrical grinding surface.

16. A grinding wheel comprising a mandrel, a series of abrasive segments arranged around but spaced at a considerable distance from the mandrel to form a grinding surface, the segments having clamping shoulders thereon, blocks having clamping elements engaging said clamping shoulders, adjustable means for forcing the blocks inwardly toward the mandrel, a cementitious filler between the segments, and a rigid molded body between the mandrel and segments having intimate contact with the segments and serving substantially as the sole internal compression support therefor.

17. A grinding wheel comprising a series of abrasive segments arranged as an annulus of substantial internal radius to form a large-diametered external cylindrical abrasive surface, said segments being provided with clamping shoulders at their adjacent end faces; clamping blocks having clamping elements engaging said shoulders whereby each segment is engaged by a clamping element at each end face; a molded substantially monolithic body of substantial radial dimension within said abrasive annulus and contacting directly with and forming a support for the segments that is resistant to forces exerted thereagainst in a radially inward direction; and adjustable means including adjustable tension members which are embedded and extend radially in said body and which are locked after having been adjusted to place said tension elements under tension to draw said clamping elements into tight engagement with said clamping shoulders and to force the segments radially inwardly during contraction of the wheel upon cooling and to permit expansion of the wheel under heating and to thereby secure said segments rigidly on and against separation from said support.

18. A grinding wheel comprising a series of abrasive segments in an annular arrangement [illegible] ing blocks engaging said shoulders, a molded body in the space within the annulus which makes intimate contact with the segments and forms a rigid and substantially the sole internal compression support for the same, and adjustable tension members moveable within said body and engaging the blocks, said tension members being adjustable by means associated therewith comprising threaded means for tensioning them and by their tension permitting said members to be drawn inwardly to clamp the blocks tightly against the body.

19. A grinding wheel assemblage comprising a cylindrical body of substantial radius and made of molded concrete and having transverse ribs in its external cylindrical surface; a series of abrasive segments arranged in end-to-end relation with filler means between adjacent end faces to form an abrasive annulus extending about and mounted on said body by molding said body in situ against said segments and which coacts to support them against grinding reactions tending to thrust said segments radially inwardly, said segments having clamping shoulders in their adjacent end faces, and having portions received between said ribs to prevent circumferential displacement by grinding reactions tending to shift the segments circumferentially whereby said body serves to transmit driving torque to said segments; clamping blocks having clamping elements engaging said shoulders whereby each segment is engaged at its two ends; an internal metal annular member encased by said concrete body; tie-rods connected with said blocks and extending radially into said concrete body and having connections at their inner ends to said metal annular member, said tie-rods having sleeve means thereabout whereby they are moveably embedded in the concrete of said body; and means operated during assembly for adjusting said rods to give them tension to secure the segments rigidly in position against separation in a radially outward direction from said cylindrical concrete body.

GEORGE R. JEFFERSON.
[illegible]